(12) United States Patent
Hecht

(10) Patent No.: US 6,599,060 B2
(45) Date of Patent: Jul. 29, 2003

(54) CUTTING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 10/206,077

(22) Filed: Jul. 29, 2002

(65) Prior Publication Data

US 2003/0031519 A1 Feb. 13, 2003

(30) Foreign Application Priority Data

Aug. 12, 2001 (IL) .................................. 144855

(51) Int. Cl.⁷ .......................... B23P 15/28; B23B 29/00
(52) U.S. Cl. ....................... 407/102; 407/104; 407/105
(58) Field of Search .......................... 407/102, 103, 407/104, 105, 107, 108

(56) References Cited

U.S. PATENT DOCUMENTS

| | | | |
|---|---|---|---|
| 3,491,421 A | | 1/1970 | Holloway .................... 29/96 |
| 3,787,941 A | * | 1/1974 | Novkov ...................... 407/105 |
| 3,807,007 A | * | 4/1974 | Lindskog .................... 379/368 |
| 4,615,650 A | | 10/1986 | Hunt ........................ 407/105 |
| 4,632,593 A | * | 12/1986 | Stashko ..................... 407/105 |

FOREIGN PATENT DOCUMENTS

| | | |
|---|---|---|
| GB | 1341651 | 12/1973 |
| JP | 11291105 | 10/1999 |
| JP | 11291106 | 10/1999 |

* cited by examiner

*Primary Examiner*—Willmon Fridie, Jr.
(74) *Attorney, Agent, or Firm*—Womble, Carlyle

(57) ABSTRACT

A cutting tool comprising a holder and a cutting insert mounted therein. A second bore of the holder extends downwardly from an insert receiving pocket. A third bore extends rearwardly from the second bore and opens into a fourth bore. A locking pin inserted in the second bore protrudes upwardly into the first through bore. A protrusion extends rearwardly from an upper portion of the locking pin. A rearwardly facing groove in a lower portion of the locking pin is co-aligned with the third bore. A plunger is received in the third bore. A forward portion of the plunger is in contact engagement with the groove. A rear portion of the plunger has a first engagement surface transversely directed to a first axis (A) of the plunger. A clamping member, engaged in the fourth bore and having a second engagement surface, is in contact engagement with the first engagement surface.

22 Claims, 6 Drawing Sheets

CUTTING TOOL

FIELD OF THE INVENTION

The present invention relates to a cutting tool having a cutting insert retained in an insert receiving pocket by means of a clamping pin. More particularly, the clamping pin is actuated by means of a clamping screw engaged in a side face of the cutting tool.

BACKGROUND OF THE INVENTION

Cutting tools having a cutting insert retained in an insert receiving pocket by means of a clamping pin are known. Such a tool is shown, for example, in U.S. Pat. No. 4,615,650 to Hunt. As shown in FIGS. 4 and 5 of '650, a cutting insert 6 is retained in a recess 4 of a tool holder 2. The cutting insert 6 is secured by passing a locking pin 8 through a cutting insert bore 10. The locking pin 8 includes a first portion 28 dimensioned for insertion through the cutting insert bore 10 and a second adjacent portion 30 dimensioned for insertion into a first bore 22 of the tool holder. Engagement means include a pocket 58' which extends into the second portion 30 at an angle relative to the axis 56' and is defined by a wall 60' which is preferably cup-shaped. A drawing member 24' is in the form of a set pin having preferably a rounded end to bear against the cup-shaped wall 60'.

When tightening the set pin it is urged against the wall 60' thereby pushing the locking pin 8 further into the first bore 22 so that the locking pressure is exerted in a first direction 36 downwardly on the front portion of the cutting insert bore 10, and, in a second direction 44 rearwardly on the rear portion of the cutting insert bore 10.

In the tool of '650, the set pin 24' is directed rearwardly with respect to the tool and is generally in the same plane as the locking pin 8. Such an arrangement is not suitable when it is required to operate the clamping screw from a side face of the tool, that is, perpendicular to the view in FIG. 5 of '650.

Another tool of the above kind is shown in Japanese Publication Number 11291105 A to Masayuki. As shown in '105, a crank pin 25 having a head 26 is inserted in both a body insertion hole 23 in a tool body 11 and an insertion hole 22 in a tip 15 mounted on a tip attachment seat 13. An oblong hole 23a extends to an intersection of two side walls 13b, 13c of the tip attachment seat 13 so that it regulates a slanting direction of the crank pin 25 in the body insertion hole 23. By pressing a cylindrical shaft 27 of the crank pin 25 by a fixed screw 30, the crank pin 25 is pulled in so that it slants and the tip 15 is pressed and fixed to a bottom face 13a of the tip attachment seat 13 and the side walls 13b, 13c by means of the head 26.

In the tool of '105, since the crank pin 25 passes through the tip 15 into the insertion hole 23, it is necessary to dismantle the crank pin in order to replace the tip 15. Also, in such an arrangement, the fixed screw 30 is generally directed in, or slanted with respect to, the direction of the plane in which the crank pin 25 moves. The fixed screw 30 cannot be perpendicular to the movement direction of the crank pin 25 and be separated therefrom if it is required to operate the fixed screw from such a direction.

Another tool of the above kind is shown in U.S. Pat. No. 3,491,421 to Holloway. As shown in FIG. 8 of '421, a tool holder 10C is provided with a bore 65 enlarged at 66 for providing a shoulder 67 between the two bores. A wobble pin 20C has a lower tapering portion 70 having an inwardly arched groove 71 adjacent its lower end. A flange 72 is provided between the tapered shank portion 70 and an upwardly extending bulging end 24C. The flange 72 is arched on its edge at 73 so as to be rockably mounted in the enlarged portion 66. The wobble pin 20C is held in place by a silicone rubber 74 that enters into the groove 71.

The wobble pin 20C is actuated by a push rod 59 having a front rounded end 61 and a rear bevel surface 60. A screw 63, having a tapered end 62, pushes the push rod 59 onto the wobble pin 20C, thereby pushing forwardly the lower tapering portion 70. The tilting motion of the pin 20C, enabled by the shoulder 67 that holds the flange 72, moves rearwardly the bulging end 24C thereby retaining rearwardly the cutting insert 30 against the side walls of its pocket.

A disadvantage of the tool of '421 is that the pin 20C has to be held by a silicone rubber 74 so that it will not move upwardly by the pushing of the push rod 59. Furthermore, the production of the tool with a bore with two portions of different diameters complicates the tool and increases its cost.

Another tool of the above kind is shown in British Patent No. 1 341 651. As shown in '651, a radially symmetrical clamping lever 3 forces a cutting plate 1 rearwardly against an upstanding shoulder 10 of a pocket in a shank 9. The lever 3, disposed in a cylindrical bore, comprises two conically tapered arms 4 and 6 so that its fulcrum 8 is intermediate its ends. A collar 5 is provided at the outer end of the lever arm 3. The second lever arm 6 is provided in its outer end portion with a groove 7. Since the clamping lever 3 is radially symmetrical, the groove 7 extends all around the clamping lever 3. A clamping screw 14 extends parallel to the cylindrical bore at the shank. A wedge-shaped intermediate member 17, having a cylindrical peripheral surface and an oblique wedge surface 18, is pushed by the intermediate member 20. A forward end 19 of the intermediate member 17, that pushes forwardly the lever arm 6, is ridged and extends into the groove 7 of the lever arm 6 so that the clamping lever 3 cannot fall out even when the clamping screw 14 is loose.

According to the construction of the clamping lever 3, the forwardly pushing of the forward end 19 of the intermediate member 17 against the groove 7 causes a lever action around the fulcrum 8 thus urging rearwardly the cutting plate 1 by means of the collar 5. A disadvantage of the tool of '651 is that the cutting plate 1 is urged only rearwardly and it cannot be urged downwardly against the bottom of the pocket in the shank 9.

It is an object of the present invention to provide a cutting tool that significantly reduces or overcomes the aforementioned disadvantages.

SUMMARY OF THE INVENTION

In accordance with the present invention there is provided a cutting tool comprising a holder and a cutting insert, having a first through bore, mounted in an insert receiving pocket of the holder, the insert receiving pocket has a base wall and at least one side wall, a second bore of the holder extends downwardly from the base wall, a third bore of the holder extends rearwardly from the second bore and opens into a fourth bore of the holder, the fourth bore is slanted at a first slant angle ($\alpha$) with respect to the third bore;

a locking pin inserted in the second bore protrudes upwardly into the first through bore, the locking pin has an upper portion and a lower portion having a front side and a rear side, a protrusion extends rearwardly from the upper portion, the lower portion has a rearwardly facing groove that is substantially co-aligned with the third bore, a forward end of the groove is substantially closer to the front side of the lower portion than to the rear side of the lower portion;

a plunger received in the third bore, a forward portion of the plunger protrudes forwardly into the second bore and is in contact engagement with a forward portion of the groove, a rear portion of the plunger protrudes rearwardly into the fourth bore and has a first engagement surface transversely directed to a first axis (A) of the plunger;

a clamping member engaged in the fourth bore, the clamping member has a second engagement surface in contact engagement with the first engagement surface;

in a first position of the cutting tool, the protrusion of the locking pin is spaced forwardly from a retaining portion at a rear portion of the first through bore of the cutting insert;

in a second position of the cutting tool, the second engagement surface of the clamping member applies pressure to the first engagement surface of the plunger thereby urging forwardly the forward portion of the plunger against the forward portion of the groove of the locking pin, a first contact point in an upper section of the lower portion of the locking pin is pressed to a forward portion of the second bore and the protrusion of the locking pin presses downwardly and rearwardly the retaining portion at the rear portion of the first through bore of the cutting insert thereby securely retaining the cutting insert in the insert retaining pocket against the base wall and the at least one side wall of the insert receiving pocket.

Typically, the second bore of the holder is perpendicular to the base wall.

Generally, the second bore is substantially aligned with the first through bore.

Typically, the third bore is perpendicular to the second bore.

Further typically, the third bore is parallel to the base wall.

Preferably, the first slant angle (α) is obtuse.

Typically, the fourth bore is perpendicular to the second bore.

Further typically, the fourth bore is parallel to the base wall.

According to a specific embodiment of the present invention, the fourth bore is threaded.

Generally, the upper portion of the locking pin is generally cylindrical.

Further generally, the lower portion of the locking pin generally has a downwardly tapering frusto-conical shape.

Preferably, the forward portion of the groove in the lower portion of the locking pin has a front spherical surface that merges with a forwardly tapering frusto-conical surface rearward thereto.

Further preferably, the forward portion of the plunger has a spherical surface mating with the spherical surface of the groove.

Typically, a forward end of the spherical surface of the forward portion of the plunger is flat.

According to a specific embodiment of the present invention, the first engagement surface of the rear portion of the plunger is directed substantially at a second slant angle (β) of 55° with respect to the first axis (A) of the plunger in a top view of the plunger.

Advantageously, the second engagement surface of the clamping member directly presses the first engagement surface of the plunger.

Preferably, the clamping member constitutes a clamping screw.

Typically, a fourth distance (D4) between the forward end of the groove and an imaginary continuation of the rear side of the lower portion of the locking pin, taken in a plane perpendicular to a longitudinal axis (B) of the locking pin, is 4 to 5 times larger than a fifth distance (D5) between the forward end of the groove and the front side of the lower portion of the locking pin, taken in the same plane.

Generally, in the first position of the cutting tool the cutting insert is freely disengageable from the insert receiving pocket in an upward direction.

Preferably, a resilient member urges rearwardly the lower portion of the locking pin.

Further preferably, the resilient member is engaged within a fifth bore of the holder, the fifth bore partially opens into the second bore substantially perpendicular thereto.

Typically, the resilient member is made of rubber or silicon.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 1:
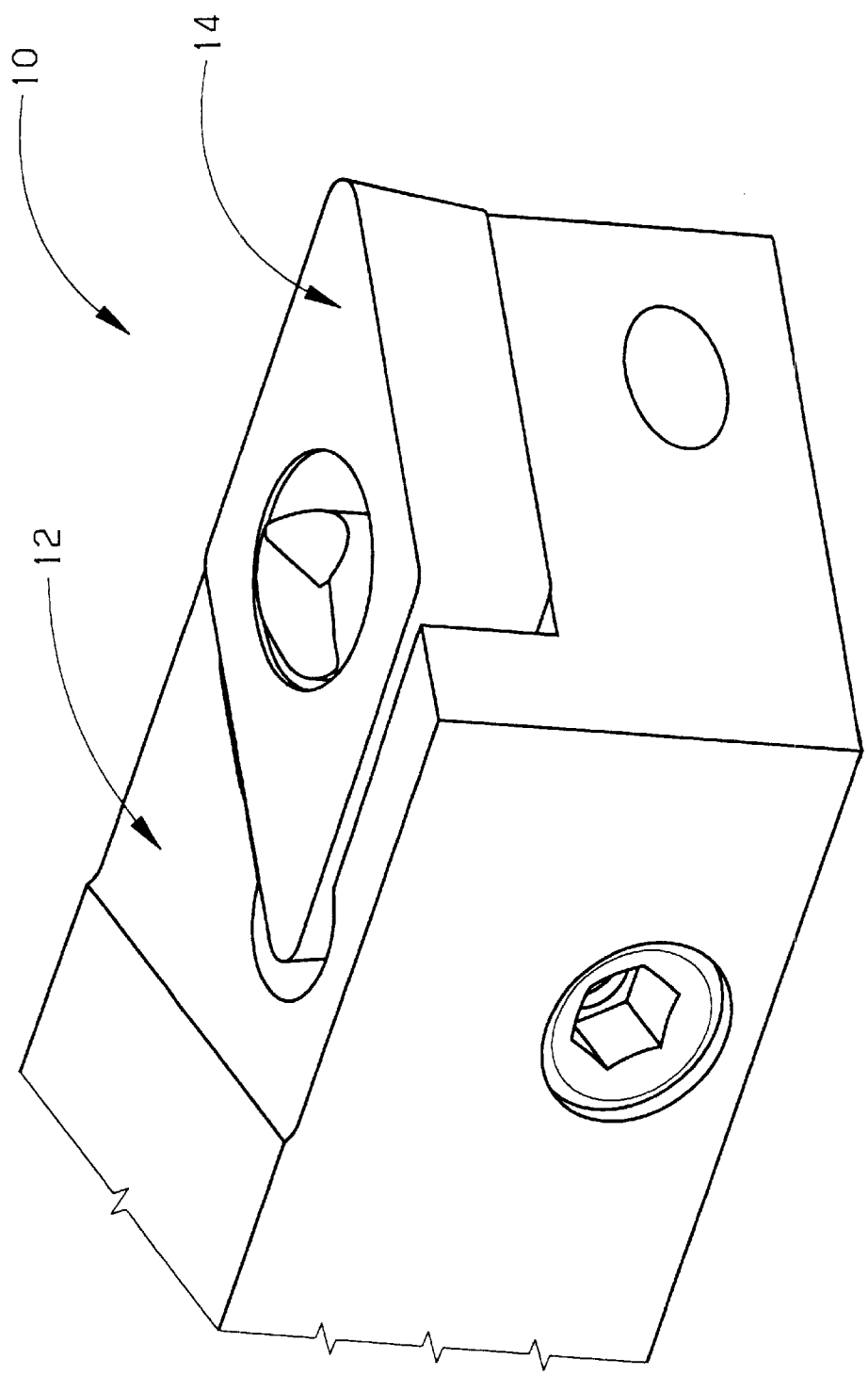
FIG. 1 is a perspective view of a cutting tool according to the present invention.
Figure 2:
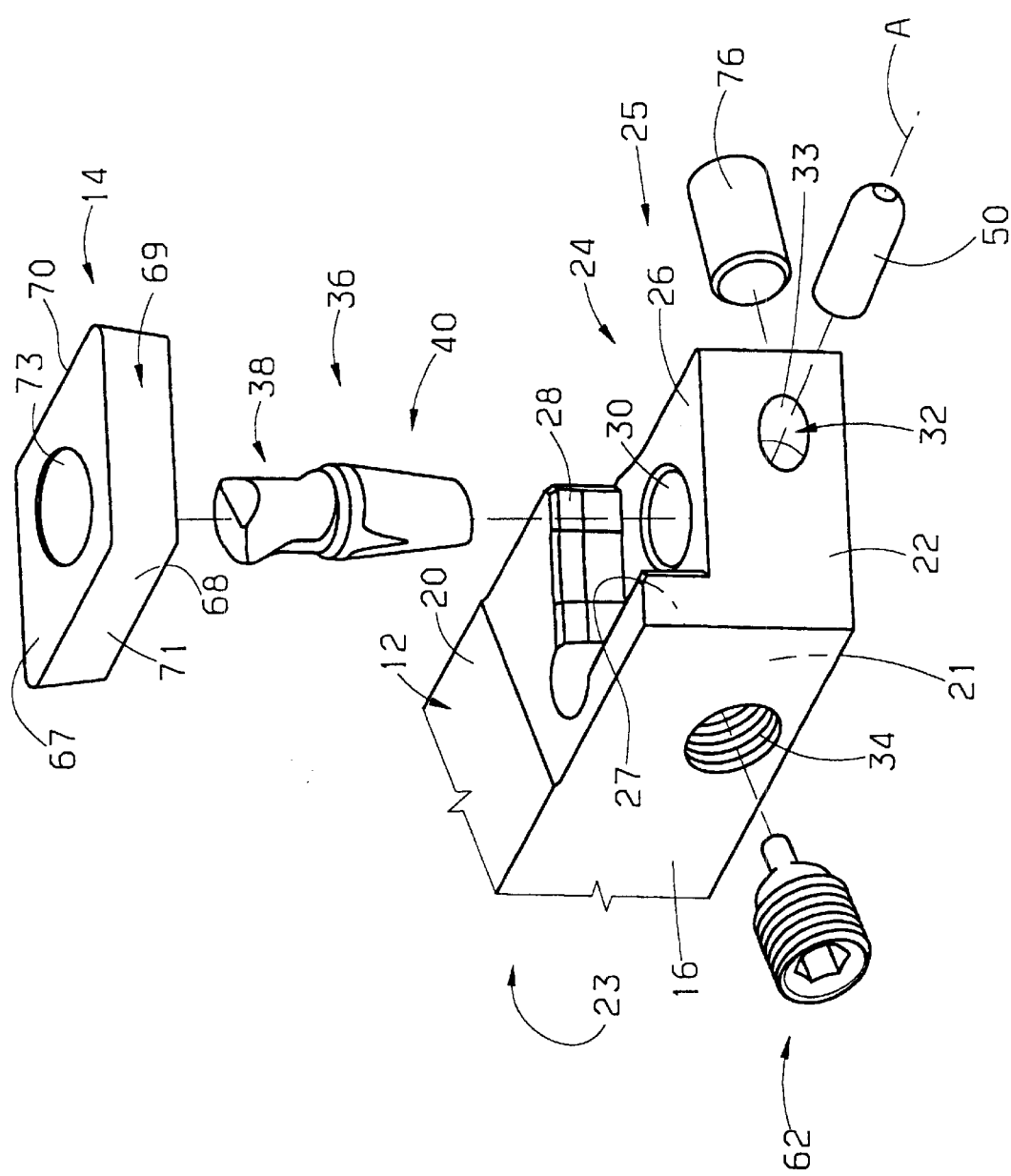
FIG. 2 is an exploded view of the cutting tool of FIG. 1.
Figure 3:
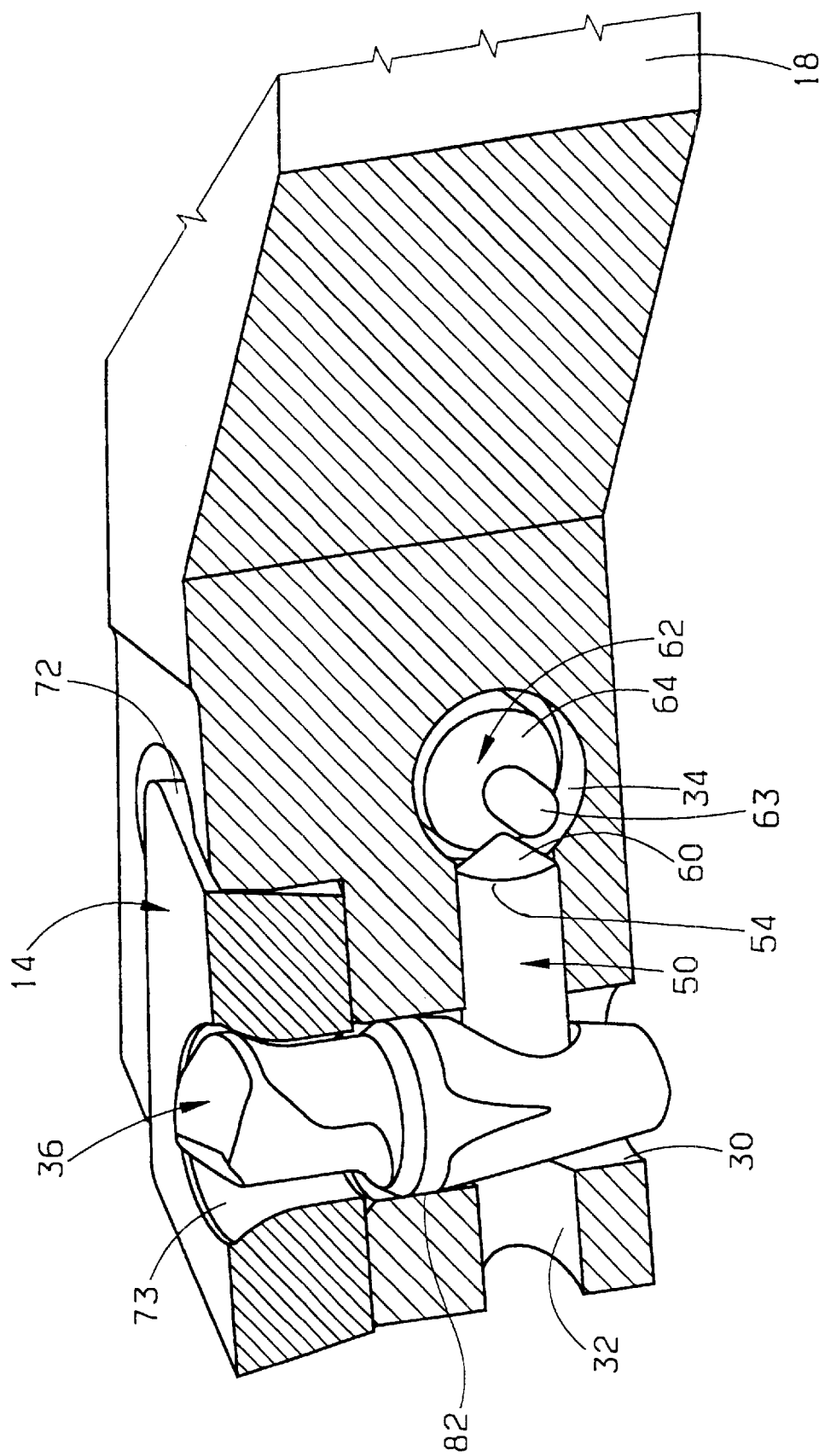
FIG. 3 is a cross-sectional perspective view of the cutting tool of FIG. 1 with the resilient member removed.

Attention is drawn to FIGS. 1 to 6. As shown, a cutting tool 10 comprises a holder 12 and a cutting insert 14 mounted therein. The holder 12 has respective right and left side surfaces 16 and 18 bounded by respective top and bottom surfaces 20 and 21 and respective front and rear surfaces 22 and 23 (the rear surface 23 is not specifically shown in the drawings). An insert receiving pocket 24 is formed in a front portion 25 of the holder 12 and opens to the respective front, top and left side surfaces 22, 20 and 18. The insert receiving pocket 24 has a base wall 26 bounded by a side wall 27 and a rear wall 28. The cutting tool described herein is a turning tool adapted for retaining a cutting insert having a 55° nose angle. However, it should be understood that the invention is not limited to the preferred embodiment only and it relates also to other kinds of machining tools and other shapes of cutting inserts, for example, hexagonal, octagonal, square or round.

The holder 12 has a second cylindrical bore 30, of diameter D3, that extends downwardly from the base wall 26 of the insert receiving pocket 24 to the bottom surface 21 of the holder 12. The second bore 30 is substantially perpendicular to the base wall 26. A third cylindrical bore 32 of the holder 12, substantially perpendicular to the second bore 30 and parallel to the base wall 26, extends rearwardly from the front surface 22, passes through the second bore 30 and opens into a fourth bore 34 of the holder 12. A forward portion 33 of the third bore 32, between the front surface 22 and the second bore 30, has an assembling purpose only, as will be later described, and has no function during the clamping of the cutting insert 14.

The fourth bore 34 is transversely directed to the third bore 32 and is typically perpendicular to the second bore 30 and parallel to the base wall 26. The fourth bore 34 forms with the third bore 32 a first slant angle α that is typically obtuse. According to a preferred embodiment, the first slant angle α is 98°. The fourth bore 34 is threaded for threadingly receive a threaded clamping member. However, the fourth bore 34 does not have to be threaded and it depends on the type of the clamping member received therein.

A locking pin 36 is inserted into the second bore 30. The locking pin 36 protrudes upwardly into the insert receiving pocket 24 and the top of the locking pin is substantially flush with the top surface 20 of the holder 12. The bottom of the locking pin is substantially flush with the bottom surface 21 of the holder 12. The locking pin 36 has a generally cylindrical upper portion 38 and a downwardly tapering generally frusto-conical lower portion 40 having a front side 41 and a rear side 43. A protrusion 42 extends rearwardly at an upper section 39 of the upper portion 38. At that section, the upper portion 38 has a largest cross dimension D taken in a plane perpendicular to a longitudinal axis B of the locking pin 36.

Figure 4:
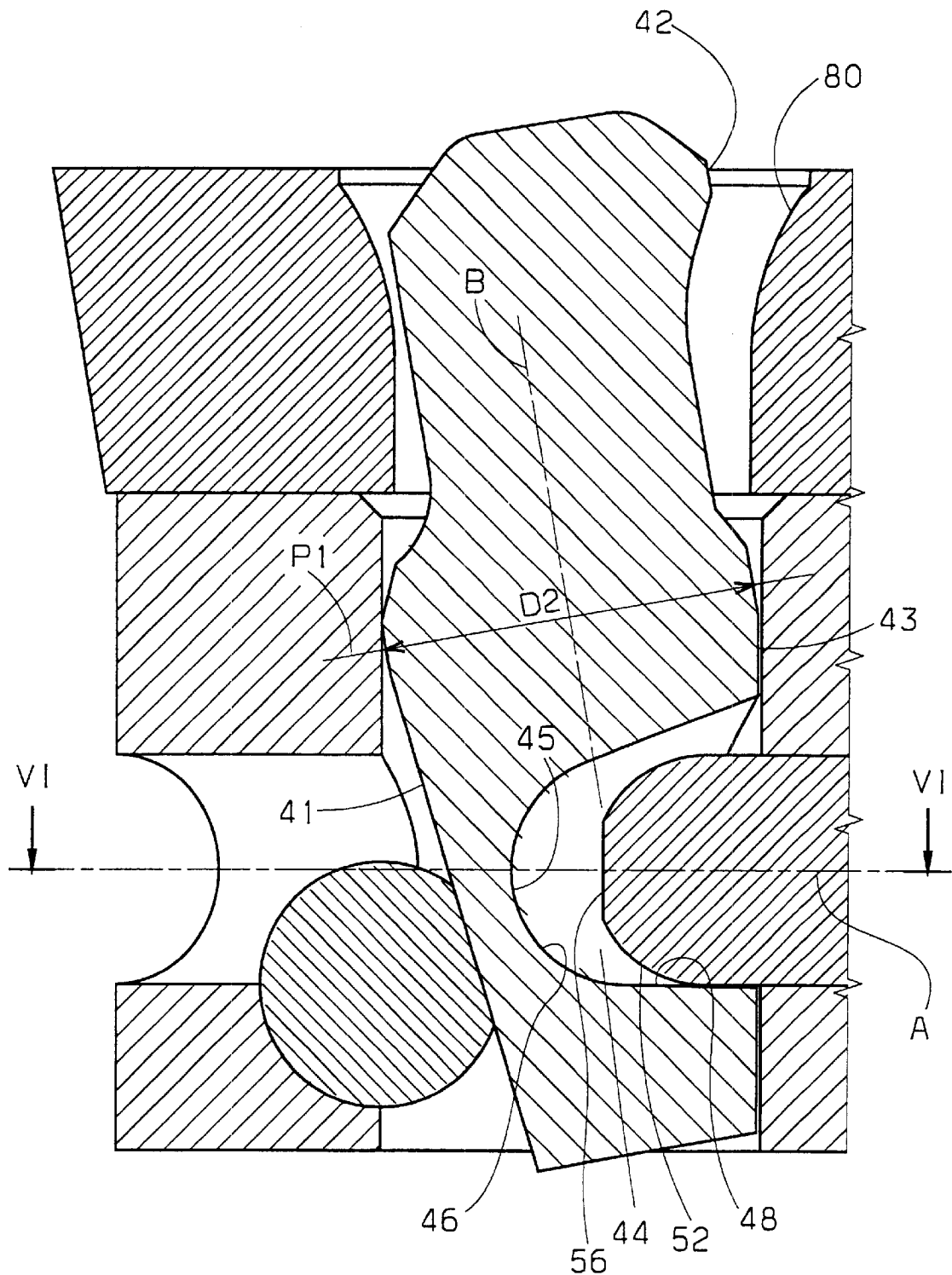
FIG. 4 is a side cross-sectional view of the cutting tool of FIG. 1 in a first assembling position.
Figure 5:
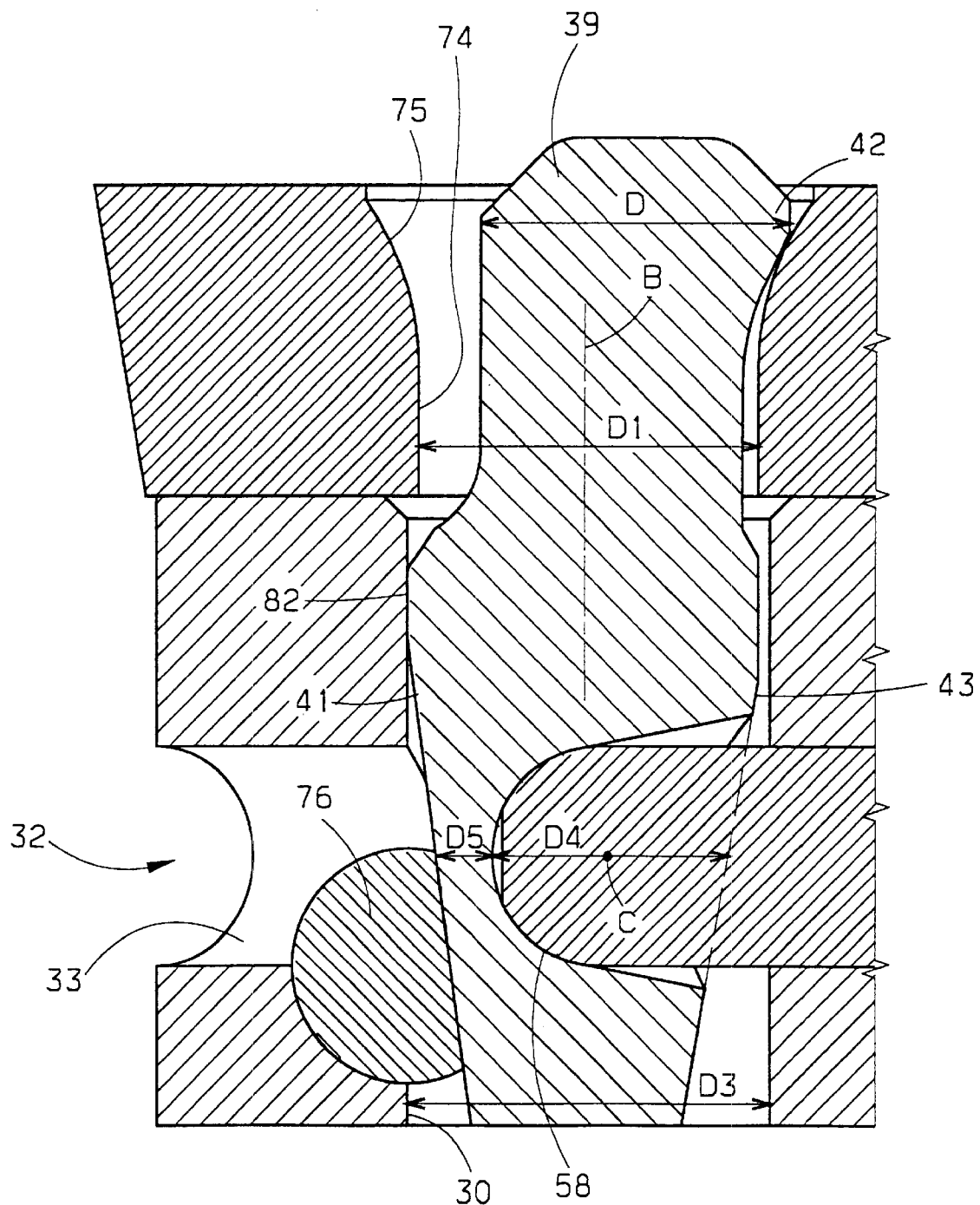
FIG. 5 is a side cross-sectional view of the cutting tool of FIG. 1 in a final assembling position.
Figure 6:
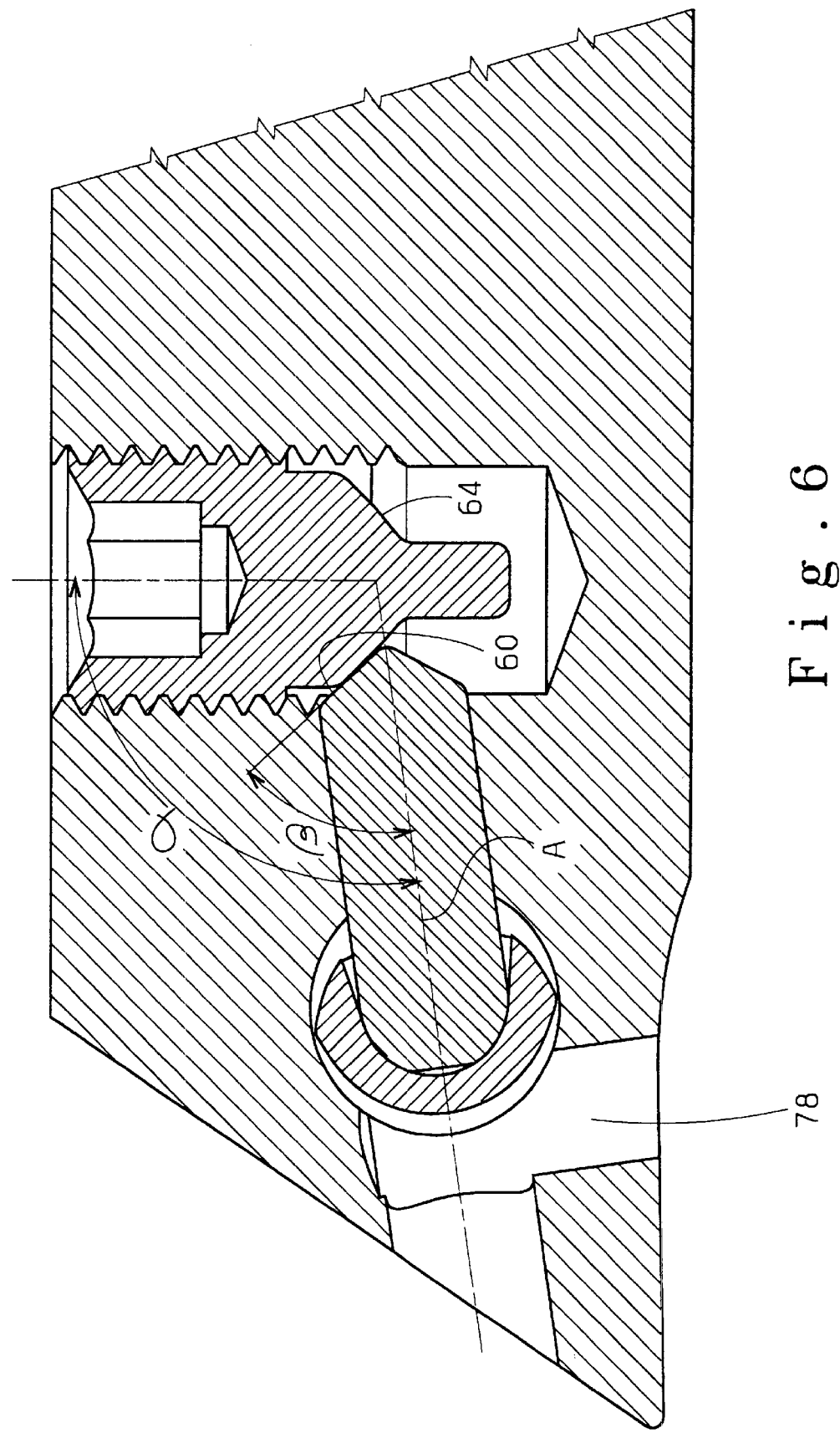
FIG. 6 is a top cross-sectional view along line VI—VI in FIG. 4 with the resilient member removed.

The lower portion 40 has a rearwardly facing groove 44 in the rear side 43 thereof. The groove 44 is substantially co-aligned with the third bore 32. The groove 44 has a front spherical surface 46 that merges with a forwardly tapering frusto-conical surface 48 rearward thereto. As can be seen in FIGS. 4 and 5, a forward end 45 of the groove 44 is substantially closer to the front side 41 of the lower portion 40 than to the rear side 43 thereof. According to a preferred embodiment, a fourth distance D4 between the forward end 45 of the groove 44 and an imaginary continuation of the rear side 43, taken in a plane perpendicular to the longitudinal axis B, is 4 to 5 times larger than a fifth distance D5 between the forward end 45 and the front side 41, taken in the same plane. The lower portion 40 has a largest cross dimension D2 taken in a plane P1 perpendicular to the longitudinal axis B. The plane P1 is located in an upper section of the lower portion 40 between the groove 44 and the upper portion 38 of the locking pin 36. The cross dimension D2 is smaller than a third diameter D3 of the second bore 30.

A plunger 50 is slidingly received in the third bore 32 through the forward portion 33 thereof. The plunger 50 has a forward portion 52 and a rear portion 54. The forward portion 52 protrudes forwardly into the second bore 30. The forward portion 52 has a spherical shape that is in contact engagement with the groove 44 and mates with its front spherical surface 46. Preferably, a forward end 56 of the forward portion 52 is flat in a direction perpendicular to a first axis A of the plunger 50. Thus, in the vicinity of the forward end 56, there is a clearance between the front spherical surface 46 of the groove 44 and the forward portion 52 of the plunger 50. By that construction it is ensured that the plunger 50 mates with the groove 44 along a relatively large and well defined toroidal contact surface 58 during the clamping action as will be later described.

The rear portion 54 of the plunger 50 protrudes rearwardly into the fourth bore 34. The rear portion 54 has a first engagement surface 60 transversely directed to the first axis A of the plunger 50 at a second slant angle β. Typically, the second slant angle β is 55° as seen in a top view of the plunger. According to a preferred embodiment, the first engagement surface 60 is conical. However, the first engagement surface does not have to be conical and it can be concavely cylindrical, flat or of any other shape.

A clamping screw 62, constituting a clamping member, is threadingly engaged into the fourth bore 34. The clamping screw 62 has, in a front portion thereof, a conical second engagement surface 64 in contact engagement with the first engagement surface 60 of the plunger 50. It should be understood that the second engagement surface 64 does not have to be conical and it depends on the shape of the first engagement surface 60 provided that pressing of the clamping member on the plunger 50 urges the plunger forwardly. According to a specific embodiment, the clamping screw 62 is provided with a forwardly protruding securing pin 63 for limiting excessive rearward movement of the plunger 50 when the clamping screw is loosened.

The cutting insert 14 has an upper surface 67, a lower surface 68 and a side surface 69 extending between the upper and lower surfaces. The intersection between the upper surface 67 and the side surface 69 constitute cutting edges 70. The side surface 69 has a side wall 71 for abutment against the side wall 27 of the insert receiving pocket 24, and, a rear wall 72 for abutment against the rear wall 28 of the insert receiving pocket 24. A centrally located first through bore 73 extends between the upper surface 67 and the lower surface 68. The first through bore 73 has a lower cylindrical portion 74 of a first diameter D1 and an upwardly flaring upper portion 75. The first diameter D1 is larger than the largest cross dimension D of the upper portion 38 of the locking pin 36. Thus, when the cutting insert 14 is seated unretained in the insert receiving pocket 24, it can be upwardly lifted and rotated in order to bring a fresh cutting edge into operative position, without the necessity to lift or dismantle the locking pin 36. It should be understood that the present invention is not limited to a cutting insert having a first through bore as described above but is equally applicable to a cutting insert having a through bore of cylindrical shape only, or, a double-sided cutting insert where the through bore is outwardly flared on its both sides.

In order to urge the locking pin 36 against the plunger 50, a resilient member 76 is inserted into a fifth bore 78 that partially opens, substantially perpendicularly, to the second bore 30 and the third bore 32. The resilient member 76 has a cylindrical shape and is made of silicon, rubber or other resilient material. The resilient member 76 is not an essential feature for the locking of the cutting insert 14 and the cutting tool 10 is equally applicable to function without the resilient member, however, for the ease of operation of the cutting tool 10, it is preferable that the lower portion 40 of the locking pin 36 be permanently resiliently urged rearwardly in any desirable form.

In order to retain a cutting insert 14 in the insert receiving pocket 24, the clamping screw 62 is loosened thus enabling the plunger 50 to slide rearwardly by means of the rearwardly directed force applied by the resilient member 76 on the lower portion 40 of the locking pin 36. Thus, as a result of the rearward movement of the lower portion 40 of the locking pin, in a first position of the cutting tool 10 the protrusion 42 of the upper portion 38 of the locking pin is spaced forwardly from a retaining portion 80 in the rear portion of the flaring upper portion 75 of the first through bore 73 of the cutting insert. At this position, a cutting insert 14 can be freely inserted into the insert receiving pocket 24 and engaged on the upper portion 38 of the locking pin 36 in a straight downward directed movement such that the second through bore is substantially aligned with the first through bore. Similarly, the cutting insert 14 is freely disengageable from the insert receiving pocket 24 in a straight upward directed movement.

It is mentioned that in a case where the cutting tool is not provided with a resilient member for applying a rearwardly directed force on the lower portion 40 of the locking pin 36, in an unretained position the cutting insert 14 is also freely disengageable from the insert receiving pocket 24 since the locking pin can freely tilt within the second bore 30.

In order to clamp the cutting insert 14 to the insert receiving pocket 24, the clamping screw 62 is threaded inwardly into the fourth bore 34. By way of the inward movement of the clamping screw, its second engagement surface 64 engages the first engagement surface 60 of the rear portion 54 of the plunger 50 thus moving the plunger forwardly. Since the forward portion 52 of the plunger 50 is urged into the front spherical surface 46 of the groove 44, they act as a ball joint having a center C. The center C does not necessarily lie on the longitudinal axis B of the locking pin but preferably is located in the vicinity thereof.

Since the center C is a mutual point of the locking pin 36 and of the plunger 50, and, since the plunger moves only in a forward translational movement, also the center C moves only forward in a translational movement. Hence, the locking pin 36 is limited to perform only a tilting motion around the center C. A first contact point 82 of the locking pin 36, against a forward portion of the second bore 30, is located on the plane P1. Thus, the forward movement of the lower portion 40 causes the first contact point 82 to slide upwardly and, since the protrusion 42 is located rearwardly to its center of rotation C, the protrusion 42 rotates backwardly and downwardly. In this second position, the protrusion 42 presses the retaining portion 80 of the first through bore 73 rearwardly and downwardly for securely retaining the cutting insert 14 in the insert receiving pocket. Thus, the side wall 71 of the cutting insert abuts the side wall 27 of the insert receiving pocket, the rear wall 72 abuts the rear wall 28 and the lower surface 68 abuts the base wall 26.

By way of the above described construction of the cutting tool, where the protrusion 42 is located substantially rearwardly to its center of rotation C and the center of rotation C pertains to a ball joint limited to a unidirectional movement, it is ensured that the locking pin 36 effectively presses the first through bore of the cutting insert both rearwardly and downwardly for securely retaining the cutting insert. It is understood that the more the center of rotation C is located forwardly to the protrusion 42, or, the greater is the ratio D4/D5, than, the greater is the downwardly directed force applied by the locking pin on the cutting insert.

The cutting tool 10 is particularly useful in a so-called "Swiss type machine". In such a type of a machine, a plurality of cutting tools 10 are disposed one above the other in front of a workpiece to be machined. It is understood that in such a disposition of the cutting tools there is a limited access to a screw opening key from the front or the top of each cutting tool, as in a prior art cutting tools. On the other hand, in the cutting tools according to the present invention, each cutting insert can be individually retained by a clamping screw acting from the side of each holder thereby enabling the replacing or indexing of a cutting insert without the necessity to dismantle each holder from the machine.

Although the present invention has been described to a certain degree of particularity, it should be understood that various alterations and modifications could be made without departing from the spirit or scope of the invention as hereinafter claimed. For example, the second engagement surface 64 of the clamping member does not have to be in direct contact with the first engagement surface 60 of the plunger. Rather, they can be separated as long as the second engagement surface 64 applies pressure to the first engagement surface 60, through, for example, another force transferring component, such as a sphere or the like.

An advantage of the cutting tool according to the present invention is that the same locking pin 36 fits any shape of cutting insert, for example, square, triangle or rhomboid. Therefore, the cost of production of the locking pin becomes cheaper. The locking pin is, preferably, produced by casting or by injection molding. In contrary to the locking pin of the present invention, prior art levers fit only one shape of cutting insert since the distance from the insert through bore to a rear abutment surface of the cutting insert changes for different shapes of cutting inserts.

What is claimed is:

1. A cutting tool comprising a holder and a cutting insert, having a first through bore, mounted in an insert receiving pocket of the holder, the insert receiving pocket has a base wall and at least one side wall, a second bore of the holder extends downwardly from the base wall, a third bore of the holder extends rearwardly from the second bore and opens into a fourth bore of the holder, the fourth bore is slanted at a first slant angle ($\alpha$) with respect to the third bore;

a locking pin inserted in the second bore protrudes upwardly into the first through bore, the locking pin has an upper portion and a lower portion having a front side and a rear side, a protrusion extends rearwardly from the upper portion, the lower portion has a rearwardly facing groove that is substantially co-aligned with the third bore, a forward end of the groove is substantially closer to the front side of the lower portion than to the rear side of the lower portion;

a plunger received in the third bore, a forward portion of the plunger protrudes forwardly into the second bore and is in contact engagement with a forward portion of the groove, a rear portion of the plunger protrudes rearwardly into the fourth bore and has a first engagement surface transversely directed to a first axis (A) of the plunger;

a clamping member engaged in the fourth bore, the clamping member has a second engagement surface in contact engagement with the first engagement surface;

in a first position of the cutting tool, the protrusion of the locking pin is spaced forwardly from a retaining portion at a rear portion of the first through bore of the cutting insert;

in a second position of the cutting tool, the second engagement surface of the clamping member applies pressure to the first engagement surface of the plunger thereby urging forwardly the forward portion of the plunger against the forward portion of the groove of the locking pin, a first contact point in an upper section of the lower portion of the locking pin is pressed to a forward portion of the second bore and the protrusion of the locking pin presses downwardly and rearwardly the retaining portion at the rear portion of the first through bore of the cutting insert thereby securely retaining the cutting insert in the insert retaining pocket against the base wall and the at least one side wall of the insert receiving pocket.

2. The cutting tool according to claim 1, wherein the second bore of the holder is perpendicular to the base wall.

3. The cutting tool according to claim 1, wherein the second bore is substantially aligned with the first through bore.

4. The cutting tool according to claim 1, wherein the third bore is perpendicular to the second bore.

5. The cutting tool according to claim 1, wherein the third bore is parallel to the base wall.

6. The cutting tool according to claim 1, wherein the first slant angle ($\alpha$) is obtuse.

7. The cutting tool according to claim 1, wherein the fourth bore is perpendicular to the second bore.

8. The cutting tool according to claim 1, wherein the fourth bore is parallel to the base wall.

9. The cutting tool according to claim 1, wherein the fourth bore is threaded.

10. The cutting tool according to claim 1, wherein the upper portion of the locking pin is generally cylindrical.

11. The cutting tool according to claim 1, wherein the lower portion of the locking pin generally has a downwardly tapering frusto-conical shape.

12. The cutting tool according to claim 1, wherein the forward portion of the groove in the lower portion of the locking pin has a front spherical surface that merges with a forwardly tapering frusto-conical surface rearward thereto.

13. The cutting tool according to claim 12, wherein the forward portion of the plunger has a spherical surface that mates with the spherical surface of the groove.

14. The cutting tool according to claim 13, wherein a forward end of the spherical surface of the forward portion of the plunger is flat.

15. The cutting tool according to claim 1, wherein the first engagement surface of the rear portion of the plunger is directed substantially at a second slant angle ($\beta$) of 55° with respect to the first axis (A) of the plunger in a top view of the plunger.

16. The cutting tool according to claim 1, wherein the second engagement surface of the clamping member directly presses the first engagement surface of the plunger.

17. The cutting tool according to claim 16, wherein the clamping member constitutes a clamping screw.

18. The cutting tool according to claim 1, wherein a fourth distance (D4) between the forward end of the groove and an imaginary continuation of the rear side of the lower portion of the locking pin, taken in a plane perpendicular to a longitudinal axis (B) of the locking pin, is 4 to 5 times larger than a fifth distance (D5) between the forward end of the groove and the front side of the lower portion of the locking pin, taken in the same plane.

19. The cutting tool according to claim 1, wherein in the first position of the cutting tool the cutting insert is freely disengageable from the insert receiving pocket in an upward direction.

20. The cutting tool according to claim 1, wherein a resilient member urges rearwardly the lower portion of the locking pin.

21. The cutting tool according to claim 20, wherein the resilient member is engaged within a fifth bore of the holder, the fifth bore partially opens into the second bore substantially perpendicular thereto.

22. The cutting tool according to claim 21, wherein the resilient member is made of rubber or silicon.

* * * * *